(12) United States Patent
Coviello

(10) Patent No.: US 9,472,077 B2
(45) Date of Patent: Oct. 18, 2016

(54) SURVEILLANCE OF A SECURE AREA

(71) Applicant: Francis Joseph Coviello, Fort Mill, SC (US)

(72) Inventor: Francis Joseph Coviello, Fort Mill, SC (US)

( * ) Notice: Subject to any disclaimer, the term of this patent is extended or adjusted under 35 U.S.C. 154(b) by 0 days.

(21) Appl. No.: 14/816,903

(22) Filed: Aug. 3, 2015

(65) Prior Publication Data

US 2016/0035198 A1    Feb. 4, 2016

Related U.S. Application Data

(60) Provisional application No. 62/032,294, filed on Aug. 1, 2014.

(51) Int. Cl.
*G08B 13/24*    (2006.01)
*G07C 9/00*    (2006.01)

(52) U.S. Cl.
CPC ....... *G08B 13/2491* (2013.01); *G07C 9/00111* (2013.01)

(58) Field of Classification Search
CPC .......... G08B 13/2491; G08B 13/2454; G08B 13/19613; G08B 13/19615; G07C 9/00111; H04N 7/188
See application file for complete search history.

(56) References Cited

U.S. PATENT DOCUMENTS

2008/0278308 A1* 11/2008 Kates .................. G08B 13/183
340/522

* cited by examiner

*Primary Examiner* — Curtis Odom
(74) *Attorney, Agent, or Firm* — Moore & Van Allen PLLC; Nicholas C. Russell

(57) ABSTRACT

Embodiments of the invention are directed to a system, method, and computer program product for surveillance of a secure area. The present invention typically includes a memory, a processor, and a module configured to monitor the secure area. In this regard, an embodiment of the present invention may receive an indication that a user is within the secure area and determine, using an authentication device sensor, whether the user has the authentication device to remain within the confines of the secure area. The user may have continued access to the secure area if the authentication device detected. On the other hand, the security personnel associated with the secure area may be notified of an unauthorized user when the authentication device is not detected.

20 Claims, 6 Drawing Sheets

SURVEILLANCE OF A SECURE AREA

RELATED APPLICATIONS AND PRIORITY claim 35 U.S.C. §119

This application claims priority to U.S. Provisional Application No. 62/032,294 filed Aug. 1, 2014, and hereby is expressly incorporated by reference herein.

BACKGROUND OF THE INVENTION

Video surveillance assures the security of a room or building by means of monitoring a secure area (e.g., building, room, or the like) or limiting the access to that secure area to specific people and by keeping records of such accesses. Most security devices utilize an individual-authentication method to limit access to specific people based on security tokens such as a fob, a smart card, a mobile device token, or the like and limits access to only those people who hold an allocated security token.

Nowadays, video surveillance requires a certain level of synergy. Yet the security industry has continued to provide disparate devices, with limited communication between the devices. Even today, with all the technologies available, the industry is struggling to fully succeed at building security solutions that fulfill the users' true needs—a cohesive surveillance device that is efficient, non-invasive, non-proprietary, and cost effective. With recent advancements in software technology, integration has become a popular substitute for traditional interfacing to provide unity between video, access, and intrusion devices with built-in reporting and alert management functionality.

BRIEF SUMMARY

Embodiments of the present invention address the above needs and/or achieve other advantages by providing apparatuses (e.g., a system, computer program product, and/or other device) and methods for a security monitoring system.

Access management controls who should be permitted access to facilities and restricted areas; where they can access (e.g., rooms, terminals, buildings, or the like); and when they can access these areas (e.g., certain times of the day, certain days of the week, or the like). In addition to controlling passage in and out of facilities or areas, determining who belongs and who does not, access management includes the ability to observe and track movement in and out of controlled/secured areas. Entities grant access for various combinations of persons and assets, depending on the needs and restrictions established by each entity.

Typically, access management includes intrusion detection and surveillance. Intrusion detection in general, is the ability to know when a user has entered a secure area, and may include the ability to determine the identity of that person. This method of tracking includes both authorized and unauthorized activity, and therefore may serve as both a staff management and security management tool. Surveillance is the ability to monitor a specified area.

In some embodiments, a security monitoring system is presented. The system comprises a memory device with computer-readable program code stored hereon; a communication device; a processing device operatively coupled to the memory device and the communication device, wherein the processing device is configured to execute the computer-readable program code to receive an indication that a user entered a secure area, wherein the indication is based on at least a user image captured by a data capturing device and a sensor device; determine, using an authentication device sensor, whether the user has an authentication device based on at least receiving the indication that the user entered the secure area; determine that the user does not have the authentication device; initiate a first warning as an indication that the user does not have the authentication device; determine that the user has not produced the authentication device a predetermined period of time after the initiation of the first warning; and notify security personnel that the user has not produced the authentication device a predetermined period of time after the initiation of the first warning.

In some embodiments, the invention is further configured to determine that the user has the authentication device; and enable the user to access the secure area based on at least determining that the user has the authentication device.

In some embodiments, the invention is further configured to extract one or more authentication credentials associated with the user stored in the authentication device; compare the extracted one or more authentication credentials to one or more authentication credentials stored in a database to determine a match; and validate the user based on at least determining a match between the extracted one or more authentication credentials with the one or more authentication credentials stored in the database.

In some embodiments, the invention is further configured to determine, using the authentication device sensor, that the user has produced the authentication device within the predetermined period of time after the initiation of the first warning; and enable the user to access the secure area based on at least determining that the user has produced the authentication device.

In some embodiments, the invention is further configured to flag an activity/event associated with the user based on at least determining that the user has not produced the authentication device a predetermined period of time after the initiation of the first warning; transmit a recorded footage of the user to the security personnel; and initiate a second warning to indicate that the user has not produced the authentication device a predetermined period of time after the initiation of the first warning.

In some embodiments, the invention is configured to notify the security personnel using at least one or a visual alarm, audible alarm, an e-mail, a text message, or a telecommunication device.

In one aspect, a computer implemented method for monitoring a secure area for security purposes is presented. The method comprises receiving, using a computing device processor, an indication that a user entered a secure area, wherein the indication is based on at least a user image captured by an image capturing device and a motion sensor device; determining, using an authentication device sensor, whether the user is wearing an authentication device based on at least receiving the indication that the user entered the secure area; determining, using a computing device processor, that the user is not wearing the authentication device; initiating, using a computing device processor, a first warning tone as an indication that the user is not wearing the authentication device; determining, using a computing device processor, that the user has not produced the authentication device a predetermined period of time after the initiation of the first warning tone; and notifying, using a computing device processor, security personnel that the user has not produced the authentication device a predetermined period of time after the initiation of the first warning tone.

In another aspect, a computer program product for monitoring a secure area for security purposes is presented. The computer program product comprising a non-transitory computer-readable medium comprising code causing a first apparatus to receive an indication that a user entered a secure area, wherein the indication is based on at least a user image captured by an image capturing device and a motion sensor device; determine, using an authentication device sensor, whether the user is wearing an authentication device based on at least receiving the indication that the user entered the secure area; determine that the user is not wearing the authentication device; initiate a first warning tone as an indication that the user is not wearing the authentication device; determine that the user has not produced the authentication device a predetermined period of time after the initiation of the first warning tone; and notify security personnel that the user has not produced the authentication device a predetermined period of time after the initiation of the first warning tone.

BRIEF DESCRIPTION OF THE DRAWINGS

The foregoing and other advantages and features of the invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein.

DETAILED DESCRIPTION OF AN EMBODIMENT OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The present invention is directed to systems, methods, and computer program products for a security monitoring system for controlled access to a secure area. Typically, access readers are small devices located proximate to the entrances to restricted or secured areas. To gain access to an area, a user must present an authentication device to the access reader, which in turn verifies the information on the authentication device with a back-end system. Commonly used authentication device include both contact and contactless smart cards.

As used herein, a "user" may be any individual requesting authorization to access a secure area.

Figure 1:
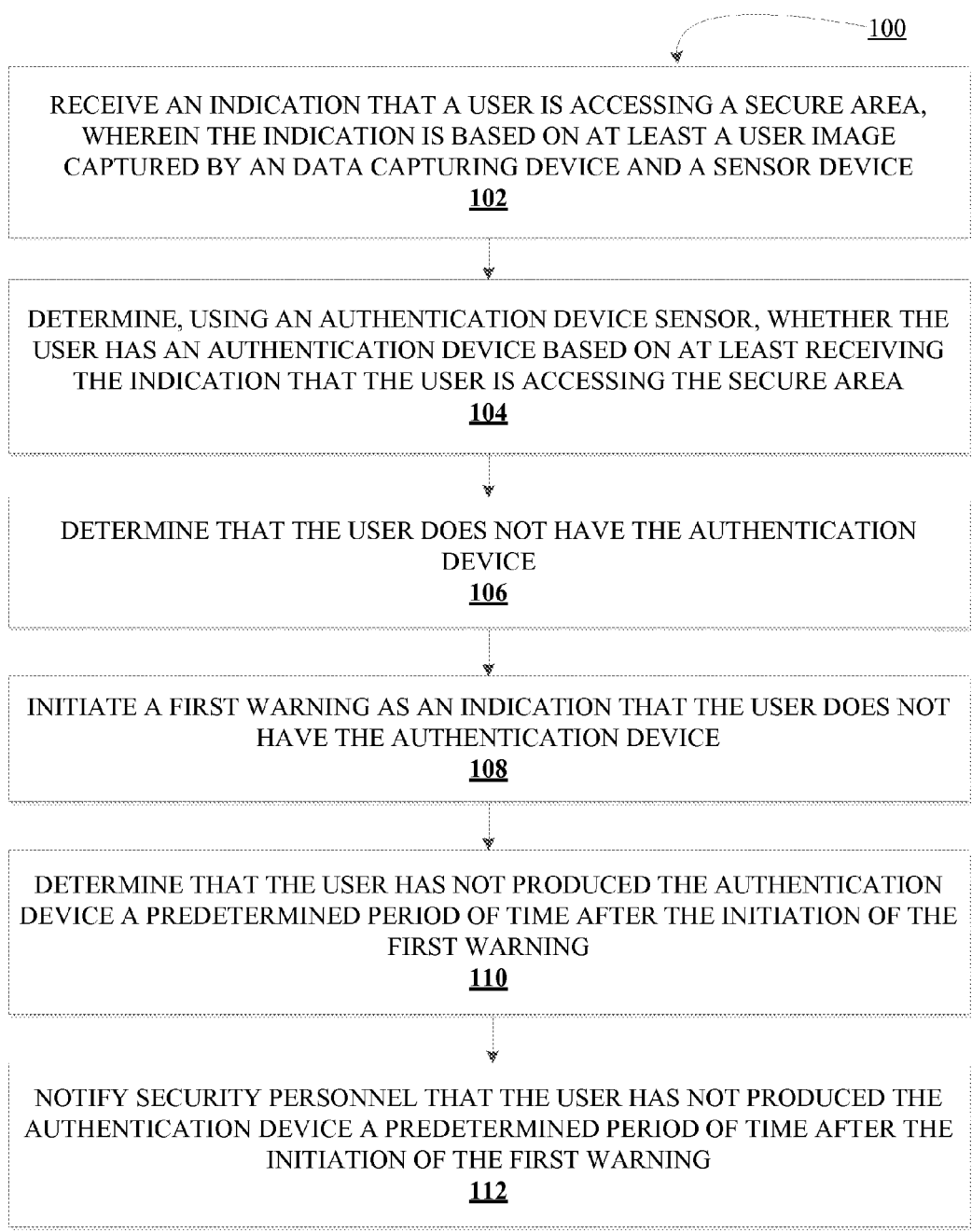
FIG. 1 illustrates a high level process flow for a security monitoring system, in accordance with one aspect of the invention.

FIG. 1 illustrates a high level process flow for a security monitoring system 100 in accordance with one aspect of the invention. In one aspect, the process flow includes receiving an indication that a user is accessing a secure area, wherein the indication is based on at least a user image captured by a data capturing device and a sensor device, as shown in block 102. In response, the process flow includes determining, using an authentication device sensor, whether the user has an authentication device based on at least receiving the indication that the user entered the secure area, as shown in block 104. In some embodiments, the process flow includes determining that the user does not have the authentication device, as shown in block 106. In one aspect, the system may be configured to initiate a first warning as an indication that the user does not have the authentication device, as shown in block 108. If the user fails to produce the authentication device after the lapse of the predetermined period of time, the process flow may determine that the user has not produced the authentication device a predetermined period of time after the initiation of the first warning, as shown in block 110 and in response, notify security personnel that the user has not produced the authentication device a predetermined period of time after the initiation of the first warning, as shown in block 112.

Typically, sensors/detectors are often integrated as a component of a system that and are configured to automatically perform a task or transmit a notification of user detection in an area. In some embodiments, the system may be configured to initiate the process flow when the sensor detects a user. Referring back to block 102, in one aspect, the sensor device may be an electronic device with a predetermined detection radius. In this regard, the sensor device detects a user when the user is within the predetermined detection radius of the sensor device. In another aspect, the sensor device may use infra-red detection to determine any disturbances in the spectrum. For purposes of this invention, a sensor device may be any electronic or mechanical device capable of detecting a user. In some embodiments, the sensor may be configured to be integrated with the image capturing device, whereby, an indication that a user has entered a secure area may cause the image capturing device to flag any motion proximate to the sensor that was triggered. In some embodiments, the system environment may include multiple sensors enabling each of the sensors to initiate the process flow described herein. In one aspect, the sensors/detectors may include, but are not limited to acoustic sensors, vibration sensors, pressure sensors, proximity sensors, temperature sensors, optical sensors, or the like.

As used herein, an "event" may include any user activity associated with the security monitoring system. In some embodiments, the system may maintain a record of every event associated with a user attempting to gain access to a secure area and populate a database with information associated with the event. In this regard, the system may include an event data recording device capable of recording information related to user access. In this way, the system may maintain a record of one or more user events associated with the secure area. In some embodiments, the system may be configured to record one or more event information associated with the event. In one aspect, the one or more event information may include a time and date associated with the event. In some embodiments, the event data recorder may enable the security personnel to populate the database with additional event information. In one aspect, the security personnel may associate the event with a user. In one aspect, the system may categorize each event into one or more different categories based on the nature of the event.

As used herein, a "data capturing device" may be any device capable of recording user activity. In one aspect, a data capturing device may be an integration of one or more data capturing devices. For purposes of the invention, a "data capturing device" and an "image capturing device may be used interchangeably. In some embodiments, the system may include one or more image capturing devices configured to work in tandem to ensure coverage of the entire secure area. In some other embodiments, the system may include an image capturing device to ensure coverage of the entrance/exit to the secure area. The image capturing device may be any device capable of motion picture acquisition and transmission. In one aspect, the image capturing device may be connected to other devices/systems in the system environment using wired connections. In another aspect, the image capturing device may be integrated into a security system using wireless connections such as wireless local area networks, wireless personal area networks, or the like. In some embodiments, the image capturing device may be a smart device or an intelligent device, which in addition to the image capture circuitry, is capable of extracting application-specific information from the captured images, along with generating event descriptions or making decisions that are used in an intelligent and automated system.

As used herein, "accessing", in the fields of physical security and information security, may refer to a selective restriction for a user to approach, enter, use, or operate in a secure area.

In some embodiments, the motion capturing devices may be capable of continuously recording activity within the secure area and store the recorded activity in a database for a predetermined period of time. After the lapse of the predetermined period of time, the system may move the recorded activity from the database to an archive for long term storage, thereby clearing allocated memory space for new activity data. Typically, archiving is the process of moving data that is no longer actively used to separate data storage device for long-time retention. Data archives consist of older data that may still be necessary for future reference, as well as data that must be retained for regulatory compliance. Usually, data archives are indexed and have search capabilities so that files and parts of files can be easily located and retrieved. In some other embodiments, the motion capturing devices may be activated by user events and may continue to record until the event is over, or until the recording time is expired.

Referring back to block 104, typically, a user may be required to produce an authentication device such as a secure token, a key card, proximity tag, a fob, or the like for accessing a secure area. In some embodiments, the authentication device may be an active device. In one aspect, the active authentication device may include an on-board battery enabling the device to periodically transmit one or more authentication credentials. In another embodiment, the authentication device may be a battery-assisted passive device. In one aspect, the battery-assisted passive device may include an on-board battery configured to be activated in the presence of the authentication device sensor. In yet another embodiment, the authentication device may be a passive device. In one aspect, the authentication device may be capable of being activated by a signal transmitted from the authentication device sensor.

In some embodiments, the authentication device may be a hardware device configured to include one or more authentication credentials associated with the user. Some authentication devices may store cryptographic keys such as a digital signature, or biometric data, such as fingerprint minutiae. In this regard, the system may be configured to receive the authentication credentials from the authentication device, compare the received authentication credentials with one or more authentication credentials stored in a database to determine a match. Typically, the one or more authentication credentials associated with the user are created and stored in a database when the user is initially granted access to the secure area. In some embodiments, the authentication device may establish confidence in user identities to be presented to an information system electronically. For example, the authentication device may be a certified digital file capable of being integrated with a mobile device in possession of the user.

In some embodiments, the authentication device sensor may be an active device sensor capable of initiating authentication replied from the authentication device. In some other embodiments, the authentication device sensor may be a passive device capable of receiving one or more authentication credentials from an active authentication device.

Typically, the user may access a secure area by producing the authentication device when the user is within or proximate to the secure area. Referring back to block 106, in some embodiments, although the user may have the have the authentication device, the authentication device may not be exposed to be detectable by the authentication device sensor. This may result in the system initiating a first warning that the user does not have the authentication device. In addition to initiating the first warning, the system may be flag the event and populate the database field with the event information including a date and time of the first warning. Referring back to block 108, in such situations, the system may be configured to enable the user to produce the authentication device within a predetermined period of time after initiating a first warning. Referring back to block 110, if the user does not produce the authentication device within the predetermined period of time after the initiation of the first warning, the system may notify the security personnel.

Figure 2:
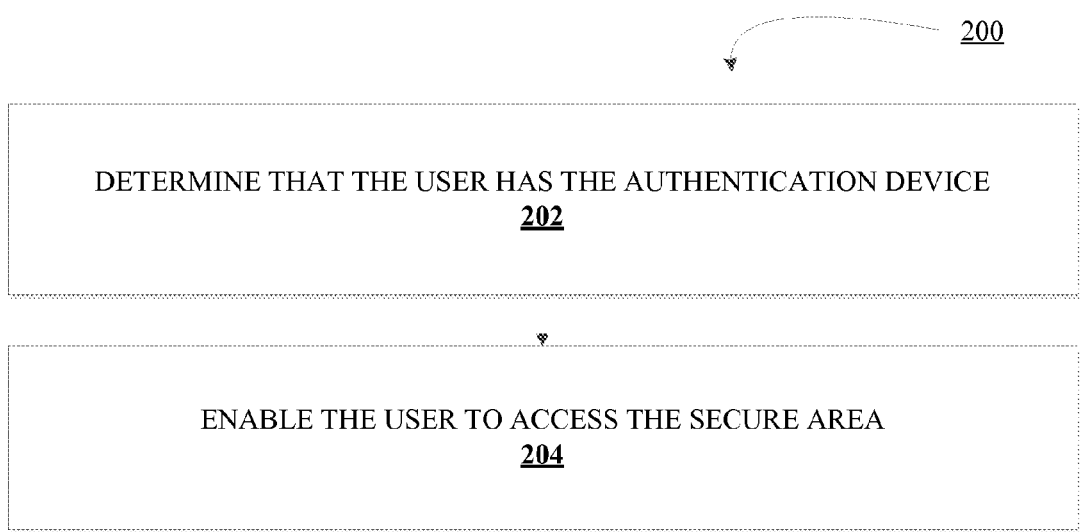
FIG. 2 presents a process flow for enabling a user access to a secure area, in accordance with another embodiment of the invention.

FIG. 2 presents a process flow for enabling a user access to a secure area 200 in accordance with another embodiment of the invention. As shown in block 202, the process flow includes determining that the user has the authentication device. In response, the process flow includes enabling the user to access the secure area, as shown in block 204. In some embodiments, the system may be configured to determine that the user has the authentication periodically. In this regard, the system may initiate a security system to determine whether the user within the secure area has the authentication device periodically (e.g., every few minutes, hours, or the like). In this way, the system may be configured to remain in a constant state of activation and determine whether the user has the authentication device at all times when the user is within the secure area. This may be useful in instances when a user's access to a secure area is revoked while the user is still in within the confines of the secure area. In such situations, the system may be configured to continuously monitor the secure area and determine that the user's access has been revoked and notify the security personnel of the immediate breach in security.

In some embodiments, the system may be configured to establish an authentication device to enable a user to access specific areas within the secure area. For example, the security monitoring device may be deployed in an entire building with one or more independent secure areas. The system may enable the user to access specific secure areas within the building, thereby securing one or more specific areas within the building. In some other embodiments, the system may be configured to determine an access level for the user to determine which of the one or more secure areas the user may access. In one aspect, the access level may be based on a job description, a security clearance, a specific group, or the like.

In some embodiments, the authentication device may be integrated with an auxiliary device associated with the user. In this way, the security monitoring system may allow the user to access the secure area only if the user has the auxiliary device. For example, the security monitoring system may be deployed in an industrial or construction site. The system may then be configured to integrate the authentication device with hard hats to enforce safety measures among construction workers. In another example, any facility that stores or uses a defined "highly hazardous chemical" must comply with the OSHA (Occupational Safety and Health Administration) and other related agencies to implement one or more protective gears for users working within the vicinity of the hazardous material. In such cases, the system may integrate one or more authentication devices in each of the protective gears required by OSHA for user to operate within the vicinity of the hazardous material.

In some embodiments, the one or more image capturing devices may be configured to determine whether the user has the authentication device based on at least the field of view of the one or more image capturing devices. In one aspect, the field of view of each of the image capturing devices may be received by a central processing unit configured to combine each of the received field of views to enable a complete coverage of the secure area. For example, a secure area with one or more enclosed areas may require one or more image capturing devices for adequate coverage. In some embodiments, the user may be in the field of view of one or more image capturing devices at a time instant. Ideally, the combination of the fields of view of the one or more image capturing devices capturing the user at that time instant are capable of receiving the user's image from all angles, thereby avoiding a "blind spot".

In some embodiments, the one or more image capturing devices may be positioned in one or more access points (e.g., doors, windows, or the like) associated with the secure area. In some other embodiments, the one or more image capturing devices may be positioned to capture the entire secure area individually or synchronously to determine whether the user has the authentication device, when the user is anywhere within the secure area. In one aspect, the one or more image capturing devices may be integrated with one or more authentication device sensors to determine whether the user has an authentication device. In another aspect, the one or more image capturing devices may be configured to determine whether the user has the authentication device. In this regard, the image capturing device may be configured to capture the authentication device within its field of view and can compare the image authentication device with an existing image in the database to determine a match.

In some embodiments, the system may be configured to enable a user to access the secure area for a predefined period of time. In this regard, the system may enable an administrator associated with the security monitoring system to establish a temporary authentication device for a user. For example, a user may be a visitor scheduled to visit the secure area during a work day and assigned a temporary authentication device. In such situations, the system may be configured to enable the user access the secure area for a predefined period of time.

Figure 3:
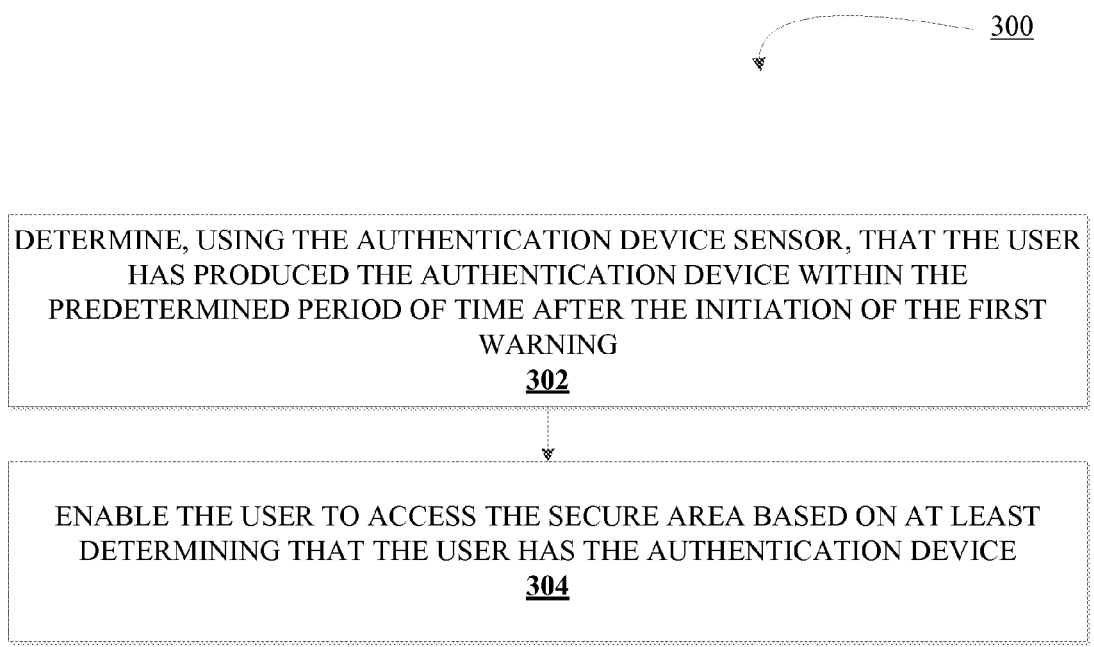
FIG. 3 presents a process flow for enabling user access after first warning, in accordance with another embodiment of the invention.

FIG. 3 presents a process flow for enabling user access after first warning 300 in accordance with another embodiment of the invention. In some embodiments, the system may be configured to determine that the user does not have the authentication device, or, the authentication device is not positioned to be detectable by the system. In such situations, the system may be configured to initiate a first warning as an indication that the user does not have the authentication device. In some embodiments, the warning may be a signal transmitted to by the authentication device sensor to the authentication device on the user. In one aspect, the warning may be a vibration of the authentication device indicating that the user may need to adjust the position of the authentication device. In another aspect, the warning may be an audible tone emitted by the authentication device based on a signal transmitted by the authentication device sensor. In yet another aspect, the warning may be visual (e.g., a blinking light). Typically, the warning may be any indication transmitted to the user that the authentication device is not detectable. In some other embodiments, the warning may be transmitted to both the security personnel and the user simultaneously as an indication that the user's authentication device is not positioned to be detectable by the system.

In one aspect, the user may adjust the position of the authentication device, thereby enabling the system to determine, using the authentication device sensor, that the user has produced the authentication device within the predetermined period of time after the initiation of the first warning, as shown in block 302. In some embodiments, the authentication device may not be detectable due to a malfunctioning authentication device. In such situations, the user, in response to receiving the warning, may approach the closest security personnel to examine the malfunctioning authentication device. In such situations, the user may be given a temporary authentication device until the malfunctioning authentication device is rectified.

In response to determining that the user has produced the authentication device, the process flow includes enabling the user to access the secure area, as shown in block 304. In some embodiments, the system may determine that the user has the proper authentication device with authentication credentials to remain within the confines of the secure area. In one aspect, system may record an event indicating that the user has produced the authentication device within the predetermined period of time after the initiation of the first warning, and populate a database field accordingly.

In some embodiments, the system may perform periodic status check of the one or more authentication devices, authentication device sensors, image capturing devices, and sensor devices to run a diagnostic test on the system performance. In one aspect, the periodic status check may be used to determine that the one or more users within the confines of the secure area are authorized personnel with adequate authentication credentials. In some embodiments, the period status check may determine that the one or more devices are malfunctioning. In such situations, the security personnel may be notified of the malfunctioning device to ensure immediate rectification.

Embodiments of the present invention may be deployed in secure areas to detect unfavorable objects. In this regard, the system may be configured to detect any unfavorable object in possession of the user, when the user is within the secure area. For example, the system may be configured to detect objects such as firearms, unauthorized data storage devices, objects such as hats, sunglasses, or visors determined to avoid the image capturing devices to identify the user, or the like.

Figure 4:
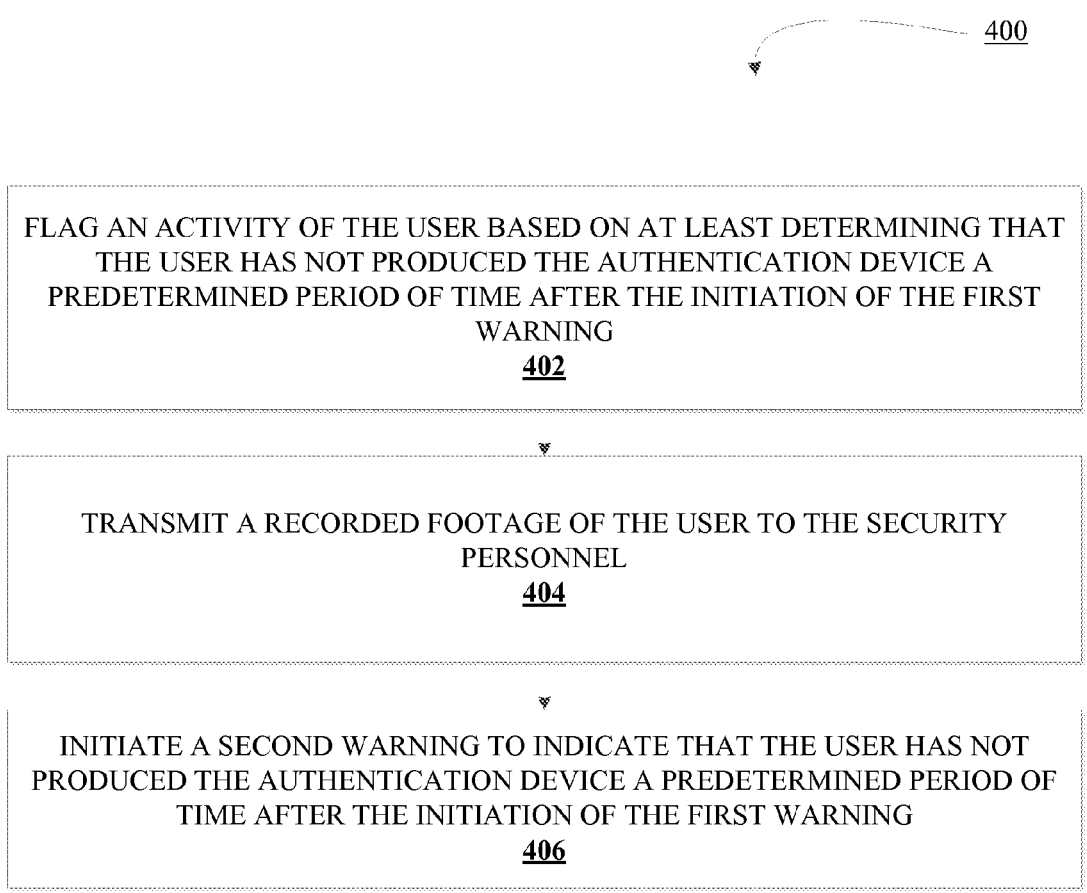
FIG. 4 illustrates a process flow for notifying security personnel, in accordance with another embodiment of the invention.

FIG. 4 illustrates a process flow for notifying security personnel 400 in accordance with another embodiment of the invention. In some embodiments, the user may not have produced the authentication device within a predetermined period of time after the lapse of the first warning. In such situations, the process flow includes flagging an activity of the user based on at least determining that the user has not produced the authentication device a predetermined period of time after the initiation of the first warning, as shown in block 402. In some embodiments, only the image capturing device proximate to the triggered sensor may be configured to flag an event of the user in the area proximate to the triggered sensor. In this regard, the system may be configured to determine the approximate location of the user based on at least determining which of the one or more sensors were triggered. In some other embodiment, one or more image capturing devices in the secure area adequately covering the area proximate to the triggered sensor may be configured to flag an event of the user in the area proximate to the triggered sensor. In response, the process flow includes transmitting a recorded footage of the user to the security personnel, as shown in block 404. In some embodiments, the system may be configured to initiate a second warning to indicate that the user has not produced the authentication device a predetermined period of time after the initiation of the first warning, as shown by the process flow in block 406.

Figure 5:
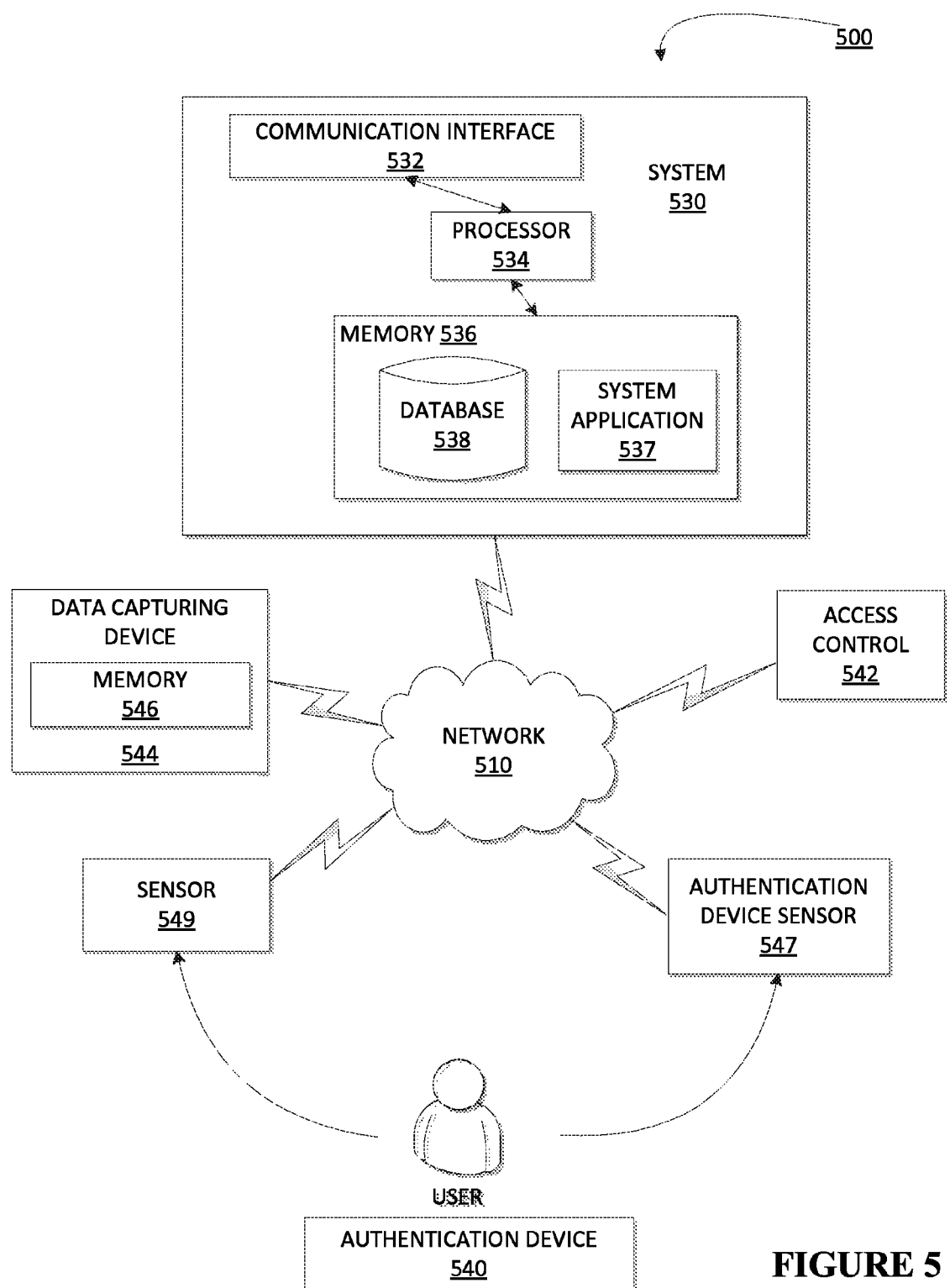
FIG. 5 presents an exemplary block diagram of the system environment 500 for implementing the process flows described herein in accordance with an embodiment of the present invention.

FIG. 5 presents an exemplary block diagram of the system environment 500 for implementing the process flows described herein in accordance with an embodiment of the present invention. As illustrated, the system environment 500 includes a network 510, a system 530, an data capturing device 544, an access control 542, an authentication device sensor 547, a sensor and 549. Also shown in FIG. 5 is an authentication device 540 associated with a user. The user may be a person who initiates the system function by virtue of being detected by the sensor 549. As shown in FIG. 5, the authentication device associated with the user may be detectable by the authentication device sensor 547 to determine a user access via access control 542. The system described herein may be deployed in any area that requires a secure access. In some embodiments, the area may be a room. In some other embodiments, the area may be a building. In one aspect, the room may be a part of the building. In such cases, the system may be deployed for secure access to either the building, or the room, or both.

As shown in FIG. 5, the system 530, the access control 542, the data capturing device 544, the sensor 549, and the authentication device sensor 547 are each operatively and selectively connected to the network 510, which may include one or more separate networks. In addition, the network 510 may include a telecommunication network, local area network (LAN), a wide area network (WAN), and/or a global area network (GAN), such as the Internet. It will also be understood that the network 510 may be secure and/or unsecure and may also include wireless and/or wired and/or optical interconnection technology.

As shown in FIG. 5, the system environment 500 includes a sensor 549 configured to detect the presence of the user entering a secure area. The sensor 549 is operatively and selectively connected to the user and the data capturing device 544 via the network 510 to activate the data capturing device 544 in response to detecting a user. The data capturing device 544 includes a memory 546 capable of storing any image/video captured and transmitting the capture image/video to the system 530 via the network 510.

As shown in FIG. 5, the system environment 500 includes an authentication device sensor 547 operatively and selectively connected the system 530 via the network 510 and the user. In one aspect, the authentication device is configured to extract authentication credentials from the authentication device 540 associated with the user and transmit the information to the system 530 via the network 510.

As shown in FIG. 5, the system environment 500 includes an access control 542 operatively and selectively connected to the system 530 via the network 510. Typically, the access control 542 is physically connected to the secure area to enable user access. The access control 542 may include an alert module (not shown) to notify security personnel if the user entering the restricted area without proper credentials. In some embodiments, the system environment may not include an access control 542.

FIG. 5 also illustrates a system 530, in accordance with an embodiment of the present invention. The system 530 may refer to the "apparatus" described herein. The system 530 may include any computerized apparatus that can be configured to perform any one or more of the functions of the system 530 described and/or contemplated herein. In accordance with some embodiments, for example, the system 530 may include a computer network, an engine, a platform, a server, a database system, a front end system, a back end system, a personal computer system, and/or the like. Therefore, the system 530 may be a server managed by the entity. The system 530 may be located at the facility associated with the entity or remotely from the facility associated with the entity. In some embodiments, such as the one illustrated in FIG. 5, the system 530 includes a communication interface 532, a processor 534, and a memory 536, which includes a system application 537 and a structured database 538 stored therein. As shown, the communication interface 532 is operatively and selectively connected to the processor 534, which is operatively and selectively connected to the memory 536.

Each communication interface described herein, including the communication interface 532, generally includes hardware, and, in some instances, software, that enables the system 530, to transport, send, receive, and/or otherwise communicate information to and/or from the one or more other systems on the network 510. For example, the communication interface 532 of the system 530 may include a wireless transceiver, modem, server, electrical connection, and/or other electronic device that operatively connects the system 530 to another system such as the access control 542. The wireless transceiver may include a radio circuit to enable wireless transmission and reception of information.

Each processor described herein, including the processor 534, generally includes circuitry for implementing the audio, visual, and/or logic functions of the user input system 540. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 547 of the memory 546 of the user input system 540.

Each memory device described herein, including the memory 536 for storing the system application 537 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

It will be understood that the system application 537 may be configured to implement any one or more portions of the various user interfaces and/or process flow described herein. The system application 537 may interact with the user application 547. It will also be understood that, in some embodiments, the memory includes other applications. It will also be understood that, in some embodiments, the system application 537 is configured to communicate with the data capturing device 544, the access control 542, sensor 549, and authentication device sensor 547.

It will be further understood that, in some embodiments, the system application 537 includes computer-executable program code portions for instructing the processor 534 to perform any one or more of the functions of the system application 537 described and/or contemplated herein. In some embodiments, the system application 537 may include and/or use one or more network and/or system communication protocols.

In addition to the system application 537, the memory 536 also includes the structured database 538. As used herein, the structured database 538 may be one or more distinct and/or remote databases. In some embodiments, the structured database 538 is not located within the system and is instead located remotely from the system. In some embodiments, the structured database 538 stores information or data described herein.

It will be understood that the structured database 538 may include any one or more storage devices, including, but not limited to, datastores, databases, and/or any of the other storage devices typically associated with a computer system. It will also be understood that the structured database 538 may store information in any known way, such as, for example, by using one or more computer codes and/or languages, alphanumeric character strings, data sets, figures, tables, charts, links, documents, and/or the like. Further, in some embodiments, the structured database 538 may include information associated with one or more applications, such as, for example, the system application 537. It will also be understood that, in some embodiments, the structured database 538 provides a substantially real-time representation of the information stored therein, so that, for example, when the processor 534 accesses the structured database 538, the information stored therein is current or substantially current.

It will be understood that the embodiment of the system environment illustrated in FIG. 5 is exemplary and that other embodiments may vary. As another example, in some embodiments, the system 530 includes more, less, or different components. As another example, in some embodiments, some or all of the portions of the system environment 500 may be combined into a single portion. Likewise, in some embodiments, some or all of the portions of the system 530 may be separated into two or more distinct portions.

In addition, the various portions of the system environment 500 may be maintained for and/or by the same or separate parties. It will also be understood that the system 530 may include and/or implement any embodiment of the present invention described and/or contemplated herein. For example, in some embodiments, the system 530 is configured to implement any one or more of the embodiments of the process flows described and/or contemplated herein in connection any process flow described herein.

Figure 6:
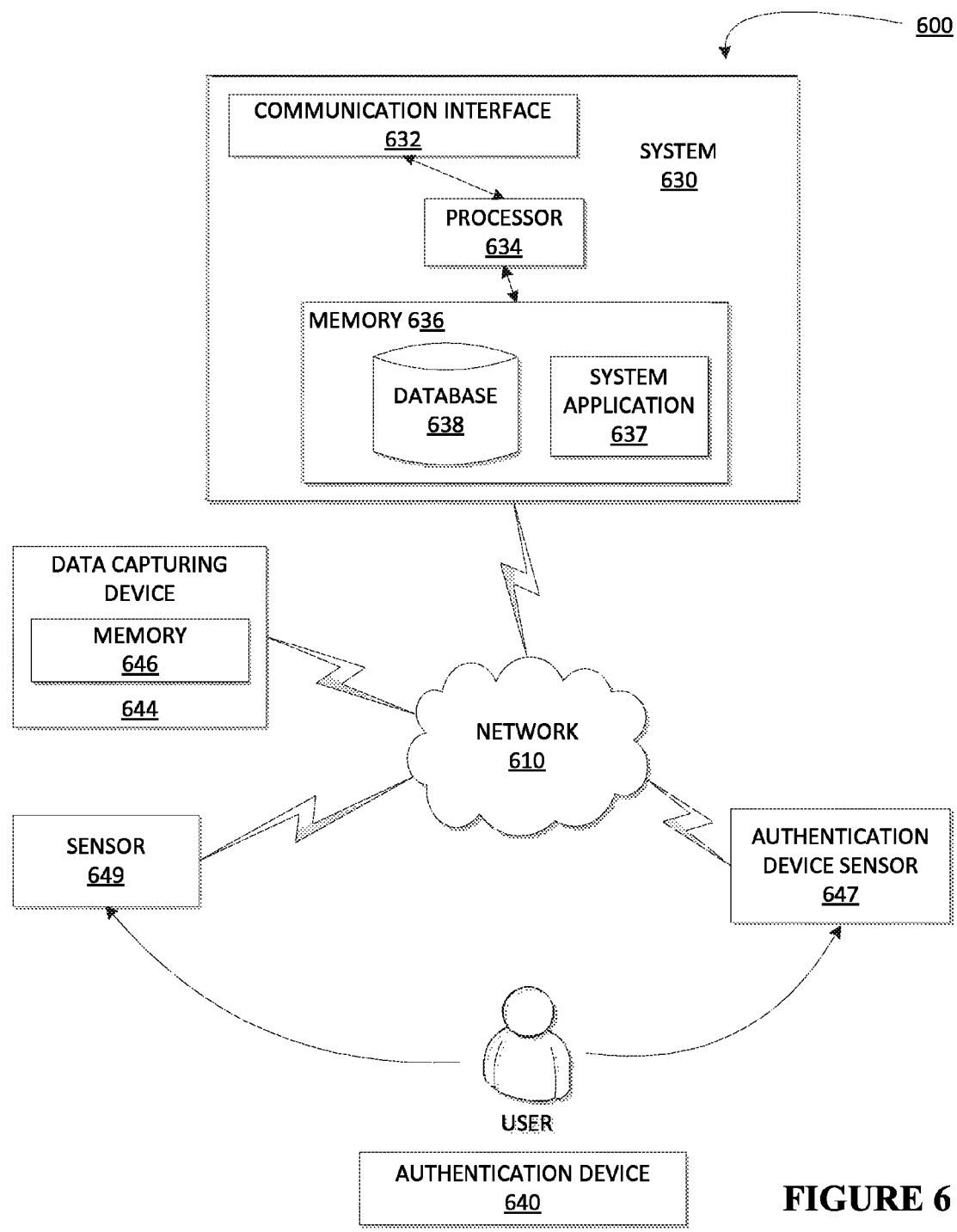
FIG. 6 presents an exemplary block diagram of the system environment for implementing the process flows described herein in accordance with continuous monitoring of the secure area.

FIG. 6 presents an exemplary block diagram of the system environment 600 for implementing the process flows described herein in accordance with continuous monitoring of the secure area. As illustrated, the system environment 600 includes a network 610, a system 630, an image capturing device 644, an authentication device sensor 647, a sensor and 649. Also shown in FIG. 5 is an authentication device 640 associated with a user. The user may be a person who initiates the system function by virtue of being detected by the sensor 649. As shown in FIG. 5, the authentication device associated with the user may be detectable by the authentication device sensor 647 to determine a user access via access control 642. In some embodiments, the system described herein may be deployed in a secure area that requires the user to continuously require authentication within the confines of the secure area. In another embodiment, the system described herein may be deployed in an access area to determine whether the user has the authentication device before gaining access to the secure area. The system 630, the image capturing device 644, the sensor 649, and the authentication device sensor 647 are each operatively and selectively connected to the network 610, which may include one or more separate networks.

For example, the system may be deployed at an airport gate wherein one or more passengers are in the ticketed area waiting to board a flight. Typically, the TSA (Transport Security Administration) physically checks the validity of each passenger's boarding pass against an airline database to determine whether the passenger is eligible to board the flight in that airport on that day. In such situations, this system may be integrated with the airline database to assign each passenger with a temporary authentication device capable of being detected by authentication device sensor. The secured areas of the airport may include one or more image capturing devices, sensors, and one or more authentication device sensors capable of detecting the authentication devices assigned to each passenger and employee. In one aspect, the authentication device may be issued to passengers and authorized persons as a temporary authorization to be in the secured area as well as providing boarding access to the passenger's boarding pass for the duration of the flight. In another aspect, the authentication device may be issued to passengers as a temporary boarding pass with a temporary boarding access for the duration of the flight.

FIG. 6 also illustrates a system 630, in accordance with an embodiment of the present invention. The system 630 may refer to the "apparatus" described herein. The system 530 may include any computerized apparatus that can be configured to perform any one or more of the functions of the system 630 described and/or contemplated herein. In accordance with some embodiments, for example, the system 630 may include a computer network, an engine, a platform, a server, a database system, a front end system, a back end system, a personal computer system, and/or the like. Therefore, the system 630 may be a server managed by the entity. The system 630 may be located at the facility associated with the entity or remotely from the facility associated with the entity. In some embodiments, such as the one illustrated in FIG. 5, the system 630 includes a communication interface 632, a processor 634, and a memory 636, which includes a system application 637 and a structured database 638 stored therein. As shown, the communication interface 632 is operatively and selectively connected to the processor 634, which is operatively and selectively connected to the memory 636.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

One or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

The one or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A security monitoring system, the system comprising:
   a memory device with computer-readable program code stored hereon;
   a communication device;
   a processing device operatively coupled to the memory device and the communication device, wherein the processing device is configured to execute the computer-readable program code to:
      receive an indication that a user entered a secure area, wherein the indication is based on at least a user image captured by an image capturing device and a motion sensor device;
      determine, using an authentication device sensor, whether the user is wearing an authentication device based on at least receiving the indication that the user entered the secure area;
      determine that the user is not wearing the authentication device;
      initiate a first warning tone as an indication that the user is not wearing the authentication device;
      determine that the user has not produced the authentication device a predetermined period of time after the initiation of the first warning tone; and
      notify security personnel that the user has not produced the authentication device a predetermined period of time after the initiation of the first warning tone.

2. The system of claim 1, wherein the processing device is configured to pause the image capturing device based on at least determining, using the authentication device sensor, that the user is wearing the authentication device, wherein pausing the image capturing device further comprises temporarily deactivating the motion sensor security system for a predetermined period of time; and enable the user to enter the secure area within the predetermined period of time after the motion sensor security system is temporarily deactivated.

3. The system of claim 2, wherein the processing device is further configured to resume the image capturing device a predetermined period of time after enabling the user to enter the secure area.

4. The system of claim 1, wherein the processing device is further configured to extract one or more authentication credentials associated with the user stored in the authentication device; compare the extracted one or more authentication credentials to one or more authentication credentials stored in a database to determine a match; and validate the user based on at least determining a match between the extracted one or more authentication credentials with the one or more authentication credentials stored in the database.

5. The system of claim 1, wherein the processing device is further configured to determine, using the authentication device sensor, that the user has produced the authentication device within the predetermined period of time after the initiation of the first warning tone; pause the image capturing device, wherein pausing the image capturing device further comprises temporarily deactivating the motion sensor security system for a predetermined period of time; and enable the user to enter the secure area within the predetermined period of time after the motion sensor security system is temporarily deactivated.

6. The system of claim 1, wherein the processing device is further configured to record a footage of the user for a predetermined period of time based on at least determining that the user has not produced the authentication device a predetermined period of time after the initiation of the first warning tone; transmit the recorded footage to the security personnel; and initiate a second warning tone to indicate that the user has not produced the authentication device a predetermined period of time after the initiation of the first warning tone.

7. The system of claim 1, wherein the processing device is configured to notify the security personnel using at least one or a visual alarm, audible alarm, an e-mail, a text message, or a telecommunication device.

8. A computer implemented method for monitoring a secure area for security purposes, the method comprising:
   receiving, using a computing device processor, an indication that a user entered a secure area, wherein the indication is based on at least a user image captured by an image capturing device and a motion sensor device;
   determining, using an authentication device sensor, whether the user is wearing an authentication device based on at least receiving the indication that the user entered the secure area;
   determining, using a computing device processor, that the user is not wearing the authentication device;
   initiating, using a computing device processor, a first warning tone as an indication that the user is not wearing the authentication device;
   determining, using a computing device processor, that the user has not produced the authentication device a predetermined period of time after the initiation of the first warning tone; and
   notifying, using a computing device processor, security personnel that the user has not produced the authentication device a predetermined period of time after the initiation of the first warning tone.

9. The method of claim 8, wherein determining further comprises pausing the image capturing device based on at least determining, using the authentication device sensor, that the user is wearing the authentication device, wherein pausing the image capturing device further comprises temporarily deactivating the motion sensor security system for a predetermined period of time; and enable the user to enter the secure area within the predetermined period of time after the motion sensor security system is temporarily deactivated.

10. The method of claim 9, wherein determining further comprises resuming the image capturing device a predetermined period of time after enabling the user to enter the secure area.

11. The method of claim 8, wherein determining further comprises extracting one or more authentication credentials associated with the user stored in the authentication device; compare the extracted one or more authentication credentials to one or more authentication credentials stored in a database to determine a match; and validate the user based on at least determining a match between the extracted one or more authentication credentials with the one or more authentication credentials stored in the database.

12. The method of claim 8, wherein determining further comprises determining, using the authentication device sensor, that the user has produced the authentication device within the predetermined period of time after the initiation of the first warning tone; pause the image capturing device, wherein pausing the image capturing device further comprises temporarily deactivating the motion sensor security system for a predetermined period of time; and enable the user to enter the secure area within the predetermined period of time after the motion sensor security system is temporarily deactivated.

13. The method of claim 8, wherein notifying further comprises recording a footage of the user for a predetermined period of time based on at least determining that the user has not produced the authentication device a predetermined period of time after the initiation of the first warning tone; transmit the recorded footage to the security personnel; and initiate a second warning tone to indicate that the user has not produced the authentication device a predetermined period of time after the initiation of the first warning tone.

14. The method of claim 8, wherein notifying further comprises notifying the security personnel using at least one or a visual alarm, audible alarm, an e-mail, a text message, or a telecommunication device.

15. A computer program product for monitoring a secure area for security purposes, the computer program product comprising a non-transitory computer-readable medium comprising code causing a first apparatus to:
receive an indication that a user entered a secure area, wherein the indication is based on at least a user image captured by an image capturing device and a motion sensor device;
determine, using an authentication device sensor, whether the user is wearing an authentication device based on at least receiving the indication that the user entered the secure area;
determine that the user is not wearing the authentication device;
initiate a first warning tone as an indication that the user is not wearing the authentication device;
determine that the user has not produced the authentication device a predetermined period of time after the initiation of the first warning tone; and
notify security personnel that the user has not produced the authentication device a predetermined period of time after the initiation of the first warning tone.

16. The computer program product of claim 15, wherein the first apparatus is configured to pause the image capturing device based on at least determining, using the authentication device sensor, that the user is wearing the authentication device, wherein pausing the image capturing device further comprises temporarily deactivating the motion sensor security system for a predetermined period of time; and enable the user to enter the secure area within the predetermined period of time after the motion sensor security system is temporarily deactivated.

17. The computer program product of claim 15, wherein the first apparatus is further configured to resume the image capturing device a predetermined period of time after enabling the user to enter the secure area.

18. The computer program product of claim 15, wherein the first apparatus is further configured to extract one or more authentication credentials associated with the user stored in the authentication device; compare the extracted one or more authentication credentials to one or more authentication credentials stored in a database to determine a match; and validate the user based on at least determining a match between the extracted one or more authentication credentials with the one or more authentication credentials stored in the database.

19. The computer program product of claim 15, wherein the first apparatus is further configured to determine, using the authentication device sensor, that the user has produced the authentication device within the predetermined period of time after the initiation of the first warning tone; pause the image capturing device, wherein pausing the image capturing device further comprises temporarily deactivating the motion sensor security system for a predetermined period of time; and enable the user to enter the secure area within the predetermined period of time after the motion sensor security system is temporarily deactivated.

20. The computer program product of claim 15, wherein the first apparatus is further configured to record a footage of the user for a predetermined period of time based on at least determining that the user has not produced the authentication device a predetermined period of time after the initiation of the first warning tone; transmit the recorded footage to the security personnel; and initiate a second warning tone to indicate that the user has not produced the authentication device a predetermined period of time after the initiation of the first warning tone.

* * * * *